(12) United States Patent
Schneider (10) Patent No.: US 8,452,882 B2
(45) Date of Patent: May 28, 2013

(54) METHOD AND AN APPARATUS TO VALIDATE A WEB SESSION IN A PROXY SERVER

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 252 days.

(21) Appl. No.: 11/804,683

(22) Filed: May 18, 2007

(65) Prior Publication Data

US 2008/0288648 A1    Nov. 20, 2008

(51) Int. Cl.
*G06F 15/16* (2006.01)

(52) U.S. Cl.
USPC ............. 709/229; 726/9; 726/10; 726/20

(58) Field of Classification Search
USPC .............. 709/229; 725/25; 726/9, 10, 20
See application file for complete search history.

(56) References Cited

U.S. PATENT DOCUMENTS

| | | | |
|---|---|---|---|
| 6,163,844 A * | 12/2000 | Duncan et al. ............ | 726/3 |
| 6,321,267 B1 | 11/2001 | Donaldson | |
| 6,467,086 B1 | 10/2002 | Kiczales et al. | |
| 6,473,895 B1 | 10/2002 | Lopes et al. | |
| 6,539,390 B1 | 3/2003 | Kiczales et al. | |
| 6,571,295 B1 | 5/2003 | Sidana | |
| 6,591,266 B1 * | 7/2003 | Li et al. ............ | 1/1 |
| 7,140,007 B2 | 11/2006 | Lamping | |
| 7,149,510 B2 | 12/2006 | Hansson | |
| 7,810,082 B2 | 10/2010 | Levenshyten | |
| 7,881,304 B2 | 2/2011 | Schneider | |
| 8,103,607 B2 | 1/2012 | Schneider | |
| 2002/0087661 A1 | 7/2002 | Matichuk et al. | |
| 2002/0099936 A1 * | 7/2002 | Kou et al. ............ | 713/151 |
| 2002/0138589 A1 | 9/2002 | Al-Kazily et al. | |
| 2003/0014628 A1 * | 1/2003 | Freed et al. ............ | 713/155 |
| 2004/0187083 A1 * | 9/2004 | Tracey et al. ............ | 715/532 |
| 2005/0091374 A1 | 4/2005 | Ganesan et al. | |
| 2006/0026286 A1 * | 2/2006 | Lei et al. ............ | 709/227 |
| 2006/0080546 A1 * | 4/2006 | Brannon et al. ............ | 713/185 |
| 2006/0149550 A1 | 7/2006 | Salminen | |
| 2006/0168199 A1 | 7/2006 | Chagoly et al. | |
| 2006/0184410 A1 | 8/2006 | Ramamurthy | |
| 2006/0288091 A1 | 12/2006 | Oh et al. | |
| 2007/0006291 A1 | 1/2007 | Barari et al. | |
| 2007/0022141 A1 | 1/2007 | Singleton et al. | |
| 2007/0022409 A1 | 1/2007 | Levenshteyn | |
| 2007/0162246 A1 | 7/2007 | Barcia et al. | |
| 2007/0283317 A1 | 12/2007 | Sadler et al. | |
| 2008/0034372 A1 | 2/2008 | Ganesan et al. | |
| 2008/0109276 A1 | 5/2008 | Ionfrida et al. | |
| 2008/0235352 A1 | 9/2008 | Yolleck et al. | |

(Continued)

OTHER PUBLICATIONS

Hypertext Transfer Protocol—HTTP/1.1, The Secure Hypertext Transfer Protocol. Jun. 1999, 114 pages.

(Continued)

*Primary Examiner* — Dustin Nguyen
*Assistant Examiner* — Joel Mesa
(74) *Attorney, Agent, or Firm* — Lowenstein Sandler LLP (57) ABSTRACT

Some embodiments of a method and an apparatus to validate a web session in a proxy server have been presented. In one embodiment, service of predetermined content is offloaded from an application server to a proxy server communicatively coupled between the application server and a client. Using the proxy server, access to the predetermined content by the client may be controlled.

24 Claims, 5 Drawing Sheets

U.S. PATENT DOCUMENTS

| | | |
|---|---|---|
| 2008/0282233 A1 | 11/2008 | Sheppard et al. |
| 2008/0289025 A1 | 11/2008 | Schneider |
| 2009/0019133 A1 | 1/2009 | Brimley |
| 2009/0132220 A1 | 5/2009 | Chakraborty et al. |
| 2009/0158244 A1 | 6/2009 | Foumani |
| 2009/0171733 A1 | 7/2009 | Bobak et al. |
| 2009/0299938 A1 | 12/2009 | Schneider |
| 2009/0300099 A1 | 12/2009 | Schneider |

OTHER PUBLICATIONS

HMAC: Keyed-Hashing for Message Athentication. Feb. 1997. 11 pages.

The Advanced Encryption Standard-Cipher-based Message Authentication Code-Pseudo-Random Function-128. Aug. 2006. 7 pages.

HTTP Over TLS. May 2000. 7 pages.

The Transport Layer Security (TLS) Protocol Version 1.1, Apr. 2006. 82 pages.

HTTP Authentication: Basic and Digest Access Authentication. Jun. 1999. 32 pages.

Hypertext Transfer Protocol (HTTP) Digest Authentication Using Authentication and Key Agreement (AKA) Version-2. Nov. 2005. 13 pages.

Office Action dated Dec. 23, 2010 for U.S. Appl. No. 11/879,723, filed Jul. 17, 2007, 21 pages.

*Hypertext Transfer Protocol*—HTTP/1.1, Secure Hypertext Transfer Protocol. Jun. 1999, 114 pages.

*HMAC: Keyed-Hashing for Message Authentication*. Feb. 1997, 11 pages, 11 pages.

*HTTP Over TLS*. May 2000, 7 pages.

*The Transport Layer Security (TLS) Protocol Version 1.1*, Apr. 2006, 82 pages.

*HTTP Authentication: Basic and Digest Access Authentication*. Jun. 1999, 32 pages.

*Hypertext Transfer Protocol (HTTP) Digest Authentication Using Authentication and Key Agreement(AKA) Version-2*. Nov. 2005, 13 pages.

*The Advanced Encryption Standard-Cipher-based Message Authentication Code-Pseudo-Random Function-128*; Aug. 2006. 7 pages.

Office Action dated Jun. 19, 2009 for U.S. Appl. No. 11/804,683, filed May 18, 2007, 15 pages.

Office Action dated Nov. 16, 2009 for U.S. Appl. No. 11/804,683.

Office Action dated Feb. 5, 2010 for U.S. Appl. No. 12/129,584.

Office Action dated Apr. 16, 2010 for U.S. Appl. No. 12/129,584.

Office Action dated Nov. 10, 2009 for U.S. Appl. No. 12/129,670.

Office Actin dated May 13, 2010 for U.S. Appl. No. 12/129,670.

Largaisse, Bert , et al., "True and Transparent Distributed Composition of Aspect-Components", Largaisse, B. and Joose, W., "True and Transparent Distributed Composition of Aspect-Components," *Middleware*, 2006, pp. 42-61.

Navarro, L. D., et al., "Explicitly Distributed AOP Using a WED", Navarro, L.D. et al., "Explicitly Distributed AOP Using a WED," *Proc. of 5th Int'l Conf. on Aspect-Oriented Software Development*, Bonn, Germany Mar. 20-24, 2006, pp. 51-62.

Nishizawa, M. , et al., "Remote Pointcut: A Language Construct for Distributed AOP", Nishizawa, M. et al., "Remote Pointcut: A Language Construct for Distributed AOP," *Proc. of 3rd Int'l Conf. on Aspect-Orient Software Development*, Lancaster, UK Mar. 22-24, 2004, pp. 7-15.

Win, Bart D., et al., "Report of the Workshop on AOSD Technology for Application-Level Security (AOSDSEC)", Win, Bart D., et al., *Report of the Workshop on AOSD Technology for Application-Level Security (AOSDSEC)*, Report TW 387, Jun. 2005.

Zdun Uwe, "Tailorable Language for Behavioral Composition and Configuration of Software Components,", Zdun Uwe, "Tailorable Language for Behavioral Composition and Configuration of Software Components," *Computer Languages, Systems & Structures*, vol. 32, Issue 1, Apr. 2006, pp. 56-82.

Notice of Allowance dated Sep. 17, 2010 for U.S. Appl. No. 12/129,584.

Navarro, L.D. et al., "Explicitly Distributed AOP Using a WED," Proc. Of 5th Int'l Conf. on Aspect-Oriented Software Development, Bonn, Germany Mar. 20-24, 2006, pp. 51-62.

Nishizawa, M. et al., "Remote Pointcut: A Language Construct for Distributed AOP," Proc. Of 3rd Int'l Cont. on Aspect-Orient Software Development, Lancaster, UK Mar. 22-24, 2004, pp. 7-15.

Zdun Uwe, "Tailorable Language for Behavioral Composition and Configuration of Software Components," Computer Languages, Systems & Structures, vol. 32, Issue 1, Apr. 2006, pp. 56-82.

Largaisse, B. and Joose, W., "True and Transparent Distributed Composition of Aspect-Components," Middleware, 2006, pp. 42-61.

Win, Bart D., et al., Report of the Workshop on AOSD Technology for Application-Level Security (AOSDSEC), Report TW 387, Jun. 2005.

Office Action for U.S. Appl. No. 12/129,584, mailed Apr. 16, 2010.

Office Action for U.S. Appl. No. 12/129,584, mailed Feb. 5, 2010.

Office Action for U.S. Appl. No. 12/129,670, mailed May 13, 2010.

Office Action for U.S. Appl. No. 12/129,670, mailed Nov. 10, 2009.

USPTO Office Action for U.S. Appl. No. 11/879,723, mailed Dec. 23, 2010.

USPTO Office Action for U.S. Appl. No. 11/879,723, mailed Jun. 24, 2010.

USPTO Office Action for U.S. Appl. No. 11/879,723, mailed Oct. 25, 2011.

USPTO Office Action for U.S. Appl. No. 11/879,723, mailed Feb. 14, 2012.

USPTO Office Action for U.S. Appl. No. 12/129,668, mailed Jun. 3, 2011.

USPTO Notice of Allowance for U.S. Appl. No. 12/129,668, mailed Sep. 20, 2011.

USPTO Notice of Allowance for U.S. Appl. No. 12/129,670, mailed Jan. 4, 2012.

\* cited by examiner

METHOD AND AN APPARATUS TO VALIDATE A WEB SESSION IN A PROXY SERVER

TECHNICAL FIELD

Embodiments of the present invention relate to web sessions, and more specifically to validating a web session in a proxy server.

BACKGROUND

As the use of the Internet is becoming more popular, more web applications are deployed. An application as used herein generally refers to a program or a suite of programs executable by one or more processors to perform tasks and/or functions. A web application broadly refers to an application accessible with a network access application (e.g., a browser) over a network (e.g., an intranet, the Internet, etc.). The web application is typically executed on a web server at the backend, while the network access application acts as a client (also referred to as a thin client) at the front end. One conventional practice in providing web applications is to use a proxy server (also referred to as a web proxy) to interface between a browser and a web server. The proxy server may forward requests and/or responses between application servers and browsers on different client machines. A series of interactions between an application server and a browser may be referred to as a web session. A web session is typically initiated by a user of the browser logging in and terminated by the user logging out.

Having the proxy server to provide a middle layer between the application servers and clients running browsers allows changing the application servers, adding application servers, removing application servers, and/or partitioning different kinds of requests from the clients to different application servers. However, as the content served by the application servers gets more complex, the application servers may become overloaded.

DESCRIPTION OF THE DRAWINGS

The present invention is illustrated by way of example, and not by way of limitation, in the figures of the accompanying drawings and in which.

DETAILED DESCRIPTION

Described herein are some embodiments of a method and an apparatus to validate a web session in a proxy server. Content as used herein broadly refers to material accessible over a network (e.g., an intranet, the Internet, etc.), which may include one or more of various types of data, such as textual data, graphic data, audio data, and video data, etc. In general, content that remains substantially unchanged throughout a web session is referred to as static content. On the contrary, content that may change during a web session, may change from session to session, and/or may be generated only upon request, etc., is referred to as dynamic content. In some embodiments, static content is offloaded from an application server to a proxy server to lighten the workload of the application server. The proxy server is communicatively coupled between a client and the application server. To protect the security of the offloaded content, the proxy server may provide access control on the offloaded content, including validating the current web session by authentication of access requests from the client. More details of some embodiments of the validation of web sessions in the proxy server are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Figure 1A:
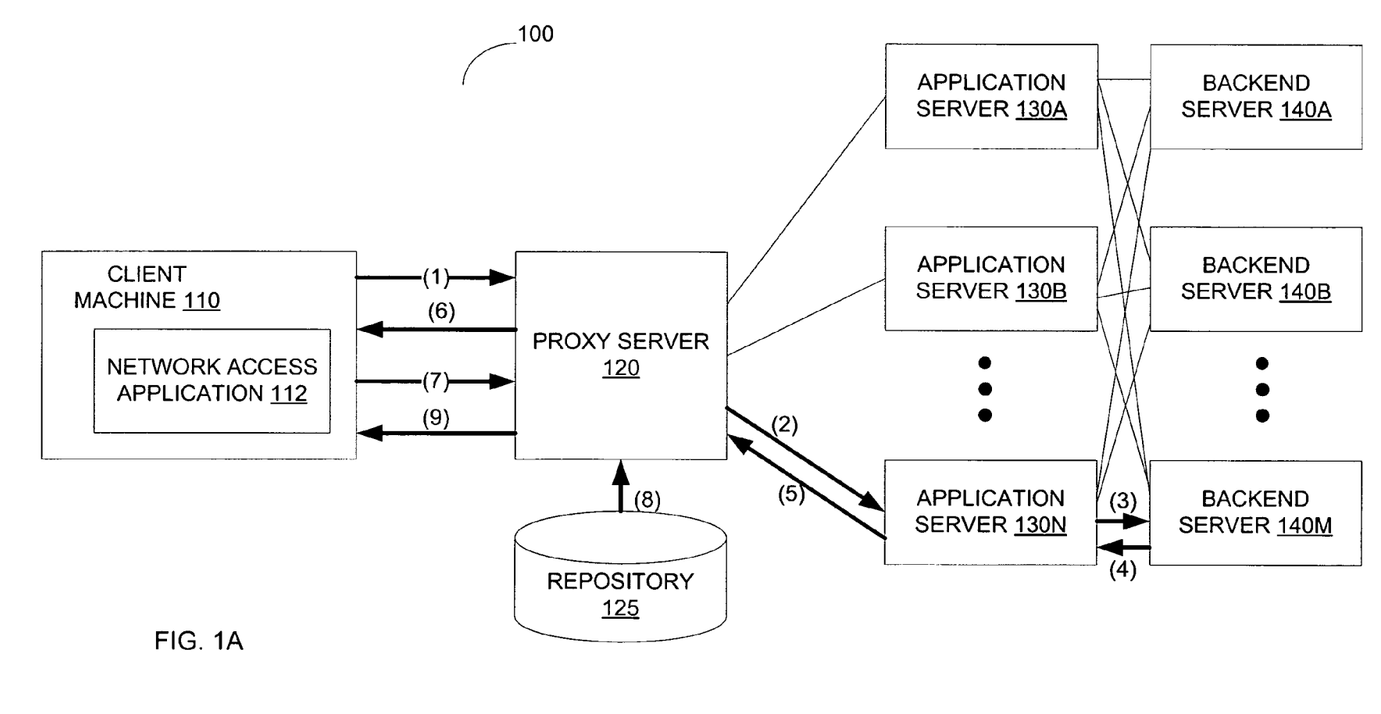
FIG. 1A illustrates one embodiment of a system in which embodiments of the present invention may be implemented.

FIG. 1A illustrates one embodiment of a system in which embodiments of the present invention may be implemented. The system 100 includes a client machine 110, a proxy server 120, a repository 125, a number of application servers 130A-130N, and a number of backend servers 140A-140M. Each of the backend servers 140A-140M typically provides a specific type of service. Some examples of the backend servers 140A-140M include a database server, a payment gateway processor, a legacy mainframe application server, etc. The application servers 130A-130N may communicate with one or more of the backend servers 140A-140M, such as to send data to or to retrieve data from the backend servers 140A-140M. The client machine 110 is coupled to the proxy server 120, which is further coupled to the repository 125 and the various application servers 130A-130N. The client machine 110 may include a computing machine, such as a desktop personal computer (PC), a laptop PC, a personal digital assistant (PDA), a mobile telephone, etc. A network access application 112 (e.g., a browser, an electronic mail engine, etc.) is being executed on the client machine 110. The proxy server 120 may be implemented using a computing machine, such as the one illustrated in FIG. 4. The proxy server 120 is further coupled to the application servers 130A-130N. The application servers 130A-130N may communicate with the client machine 110 via the proxy server 120, which serves as a gateway. To illustrate the concept, an example involving the application server 130N is described in details below.

To initiate a web session with the application server 130N, the network access application 112 sends an authentication request (1) intended for the application server 130N to the proxy server 120. The proxy server 120 forwards the authentication request (2) to the application server 130N. Upon receiving the authentication request (2) from the proxy server 120, the application server 130N attempts to authenticate the network access application 112. For instance, the network access application 112 may have included a user name and a password in the authentication request (2) and the application server 130N may access the backend server 140M (3), which is a database server, to retrieve a pre-established record having the same user name (4). Then the application server 130N may compare the user name and the password to the pre-established record to determine if there is a match. If there is a match, the network access application 112 is authenticated. Otherwise, the network access application 112 is not authenticated and the application server 130N may return an error message to the network access application 112 via the proxy server 120.

Figure 1B:
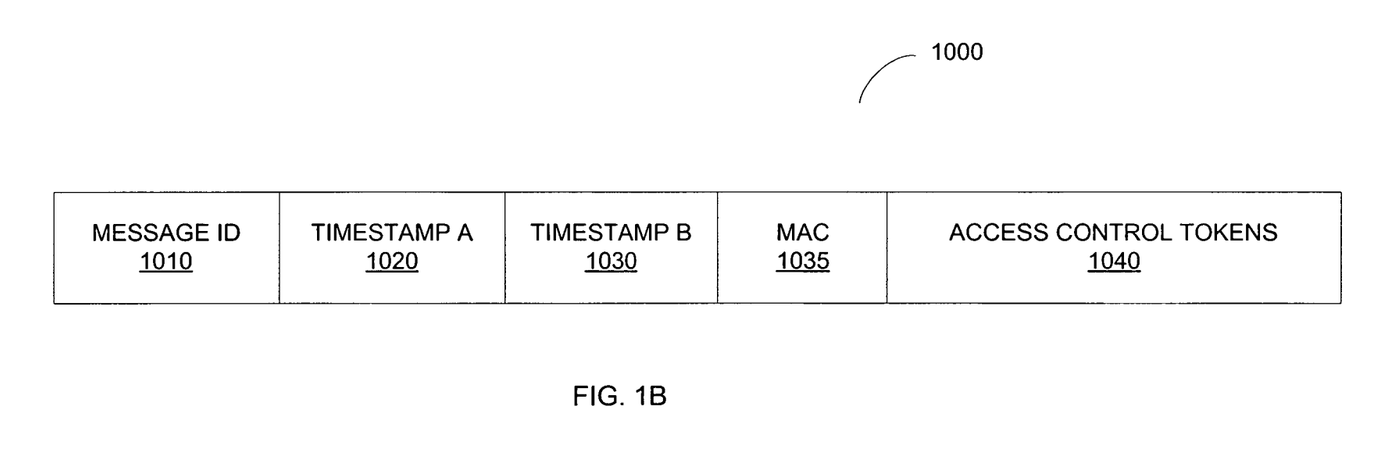
FIG. 1B illustrates one embodiment of a message from an application server to a client.

If the network access application 112 is authenticated, then the application server 130N may generate some information for authorizing the network access application 112 to access some predetermined content. For example, the network access application 112 may be executing a user interface of an online banking application of a bank and the authenticated network access application 112 is allowed to access the financial records of the user associated with the user name and password provided during authentication, but the network access application 112 is not allowed to access the financial records of other customers of the bank. In some embodiments, the application server 130N generates a message and computes a message authentication code (MAC) for the message. One embodiment of the message is illustrated in FIG. 1B. The message 1000 includes a unique message identifier 1010, a timestamp A 1020, a timestamp B 1030, a MAC 1035, and a set of access control tokens 1040 (or simply referred to as tokens). The message identifier 1010 identifies the message 1000. The timestamp A 1020 signifies when the message 1000 has been generated. The timestamp B 1030 signifies the time at which the message 1000 is no longer valid. The access control tokens 1040 indicates which type of contents the network access application 112 is allowed to access. The tokens can be provided as either part of a session identification cookie, as a separate cookie, or part of the universal resource locator (URL). In addition, the message 1000 may include other data from the application server 130N. The MAC 1035 of the message 1000 is a key for validating the web session later in the proxy server 120. The MAC 1035 may include a series of alphanumeric characters. In some embodiments, the MAC 1035 is generated in a way substantially similar to a cryptographic hash, in that the MAC 1035 is calculated from a particular message with which the MAC 1035 is sent. Part of the computation of the MAC 1035 may involve secret data so that only those who possess this secret data may compute the MAC 1035. For example, the application server 130N may send a message with a MAC computed for the message, and the proxy server 120 may accept the same message and MAC back later and reliably determine if the message has been modified without storing either the message or the MAC. Referring back to FIG. 1A, the application server 130N sends the MAC, a timestamp, and the tokens in the message (5) to the proxy server 120, which then forwards the message containing the MAC, the timestamp, and the tokens (6) to the network access application 112.

In order to improve efficiency, the application server 130N may have offloaded the service of static content to the proxy server 120. In some embodiments, the static content is stored in the repository 125 accessible by the proxy server 120. However, the static content may contain information restricted to authorized users only. To protect the static content, the proxy server 120 controls access to the static content using the information generated during the authentication process described above.

Later in the web session, the network access application 112 may attempt to access the static content. In some embodiments, the network access application 112 sends an access request (7) to the proxy server 120 for the static content during the web session. The access request (7) contains the MAC, the timestamp, and the tokens previously obtained from the application server 130N during authorization. The proxy server 120 may check the timestamp in the access request (7) to determine if the timestamp has expired yet. If the timestamp is not yet expired (i.e., still valid), the proxy server 120 may compute a new MAC based on the tokens and the timestamp in the access request (7) and compare the newly computed MAC with the MAC in the access request (7). Since the proxy server 120 and the application server 130N may share a network time server, the proxy server 120 may reliably validate the timestamp in the access request (7), and hence, the MAC in the access request (7). If the newly computed MAC and the MAC in the access request (7) are different, then it is likely that some or all of the tokens in the access request (7) have been modified and/or omitted, or the timestamp in the access request (7) has been fudged. Otherwise, if the newly computed MAC and the MAC in the access request (7) match, then the proxy server 120 may check the tokens to determine if the network access application 112 is authorized to access the requested static content. More details of the tokens are discussed below.

In some embodiments, each of the tokens identifies a particular class of static content. If the network access application 112 attempts to access a certain class of static content without the proper token, the proxy server 120 denies access to the static content. The proxy server 120 may return an error message and/or a login page. On the other hand, if the network access application 112 has provided the proper token for the static content, then the proxy server 120 grants access to the static content to the network access application 112. In some embodiments, the proxy server 120 retrieves the static page (8) from the repository 125 and serves the static page (9) to the network access application 112.

In some embodiments, the proxy server 120 and/or the application server 130N provide a way to issue updated tokens since eventually the timestamp will expire before the web session is terminated. For instance, the proxy server 120 may create a new message using the tokens passed back by the network access application 112, with a new timestamp, calculate the MAC of this new message, and then pass the newly calculated MAC, the new timestamp, and the tokens in the new message back to the network access application 112 with an indication that this new message should replace the previous message. Alternatively, the proxy server 120 may rely upon the application server 130N to perform substantially the same operations as described above since it is unlikely that the network access application 112 would access only the static content, and not generate a request that gets handled by the application server 130N from time to time.

By offloading the service of static content to the proxy server 120, the service of static content may be faster than serving the static content from the application server 130N. Furthermore, the application server 130N may generate contents not offloaded to the proxy server 120 (e.g., dynamic content) faster because the application server 130N does not have to generate the static content. In addition, the above approach improves the efficiency of the service of web content without sacrificing security by providing access control at the proxy server 120 during the web session. After the network access application 112 has been authorized at the initiation of the web session, the proxy server 120 may authenticate access requests from the network access application 112 using the MAC and tokens generated by the application server 130N earlier. In other words, the proxy server 120 may perform lightweight authentication during the web session by reusing information generated at the initial authorization by the application server 130N. Details of one embodiment of the proxy server 120 are discussed below.

Figure 2:
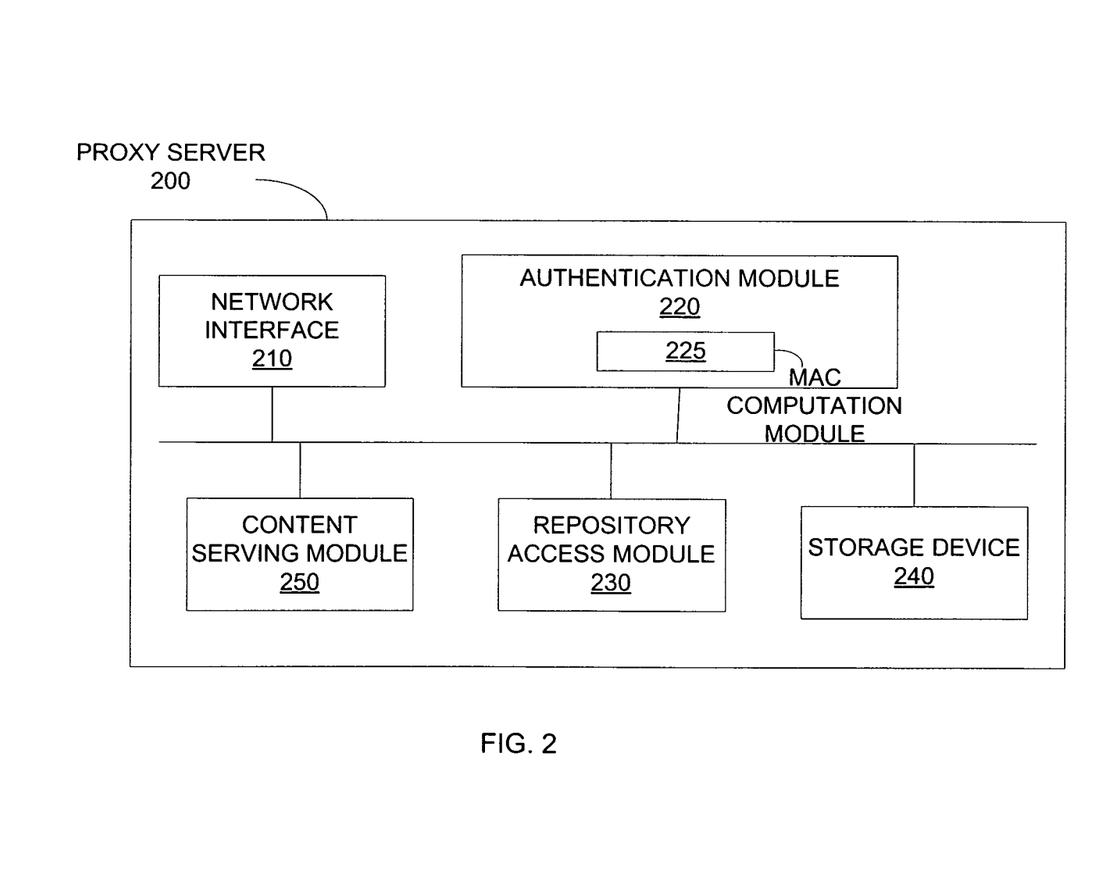
FIG. 2 illustrates a functional block diagram of one embodiment of a proxy server.

FIG. 2 illustrates a functional block diagram of one embodiment of a proxy server. The proxy server 200 may be implemented on a computing device, such as the one described with reference to FIG. 4. The proxy server 200 includes a network interface 210, an authentication module 220, a repository access module 230, a storage device 240, and a content serving module 250, which are operatively coupled to each other. The authentication module 220 further includes a MAC computation module 225.

In some embodiments, the network interface 210 communicatively couples the proxy server 200 to a network, which may include a local area network (LAN), a wide area network (WAN), an intranet, the Internet, etc. Via the network, the network interface 210 receives an access request from a network access application running on a client machine. The access request includes a timestamp, a previously obtained MAC, and a set of previously obtained tokens. Both the MAC and the tokens may be obtained at the initiation of the current web session from a backend server (e.g., an application server) as described above with reference to FIG. 1A.

In response to the request, the authentication module 220 authenticates the access request using the information contained within the request. The authentication module 220 may check the timestamp in the access request to determine if the timestamp has expired or not. If the timestamp has not yet expired, the MAC computation module 225 computes a second MAC using the tokens and the timestamp provided in the access request and compares the second MAC with the previously obtained MAC. If the second MAC matches the previously obtained MAC, the previously obtained MAC is still valid and thus, the tokens are validated or authenticated. If the tokens are authenticated, then the authentication module 220 checks the tokens to determine if the network access application is authorized to access the requested content. If the network access application is not authorized, then the authentication module 220 denies access to the requested content. The authentication module 220 may send an error message and/or a login page to the network access application. Otherwise, the authentication module 220 serves the requested content to the network access application.

In some embodiments, the requested content is stored in a storage device 240 within the proxy server 200. The proxy server 200 may retrieve the requested content from the storage device 240 and send the requested content to the network access application via the network interface 210. Alternatively, the requested content is stored in a repository coupled to the proxy server 200. The repository access module 230 retrieves the requested content from the repository and then sends the requested content to the network access application via the network interface 210.

Figure 3:
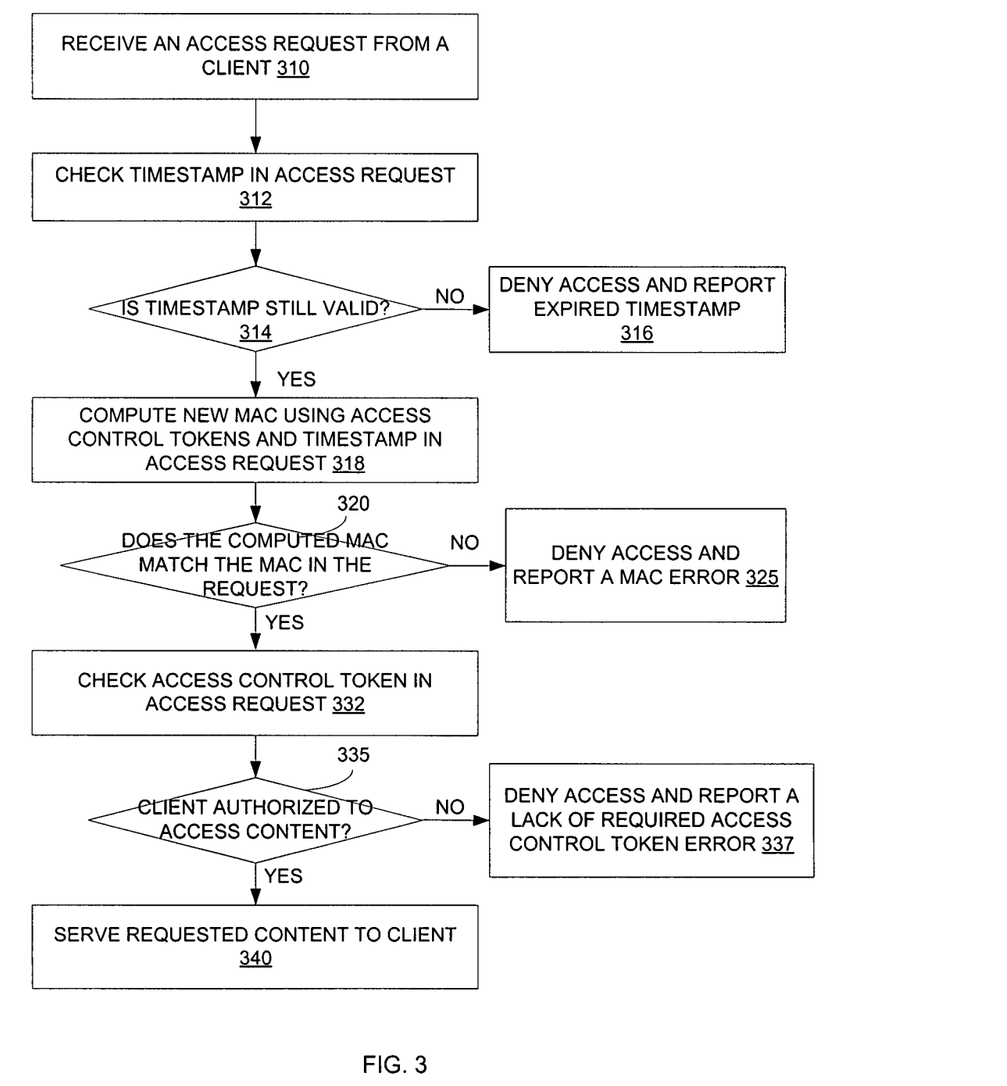
FIG. 3 illustrates a flow diagram of one embodiment of a process to validate a web session in a proxy server.

FIG. 3 illustrates a flow diagram of one embodiment of a process to validate a web session in a proxy server. The process may be performed by processing logic that may comprise hardware (e.g., circuitry, dedicated logic, programmable logic, microcode, etc.), software (such as instructions run on a processing device), firmware, or a combination thereof. For example, the proxy server 200 in FIG. 2 may perform the process in some embodiments.

In some embodiments, processing logic at the proxy server receives an access request from a client during a web session (processing block 310). For example, the client may request to access some static content. Although an application server may have authenticated the client earlier at the initiation of the web session, processing logic at the proxy server has to authenticate the client again to ensure the client is authorized to access the requested content. Thus, processing logic at the proxy server performs the operations described below to authenticate the client again.

In some embodiments, processing logic checks a timestamp in the access request (processing block 312). Processing logic determines if the timestamp is still valid (processing block 314). If the timestamp is invalid, processing logic denies access and reports an expired timestamp error (processing block 316). Otherwise, processing logic continues the process at processing block 318. Processing logic computes a new MAC using access control tokens and the timestamp in the access request (processing block 318). Processing logic then determines if the previously obtained MAC in the access request matches the newly computed MAC (processing block 320). If the previously obtained MAC matches the newly computed MAC, then the previously obtained MAC is valid. Otherwise, the previously obtained MAC in the access request is invalid, and thus, processing logic denies access to the requested content and reports a MAC error (processing block 325). The presence of the MAC error may indicate either corruption of the MAC and/or an active attempt to subvert access control.

If the previously obtained MAC is valid, processing logic checks one or more of the access control tokens in the access request (processing block 332). Then processing logic determines if the client is authorized to access the content requested (processing block 335). In some embodiments, there is a token for each type of content. If the access request includes an appropriate token for the type of content requested, then the client is authorized to access the content requested. If the client is not authorized to access the content, then processing logic denies access and reports a lack of access control token error (processing block 337), which may likely be the result of someone getting lost in the web application and trying to find their way out with an URL surgery, or even an error (a.k.a. a bug) in the web application. Otherwise, processing logic serves the requested content to the client (processing block 340).

Figure 4:
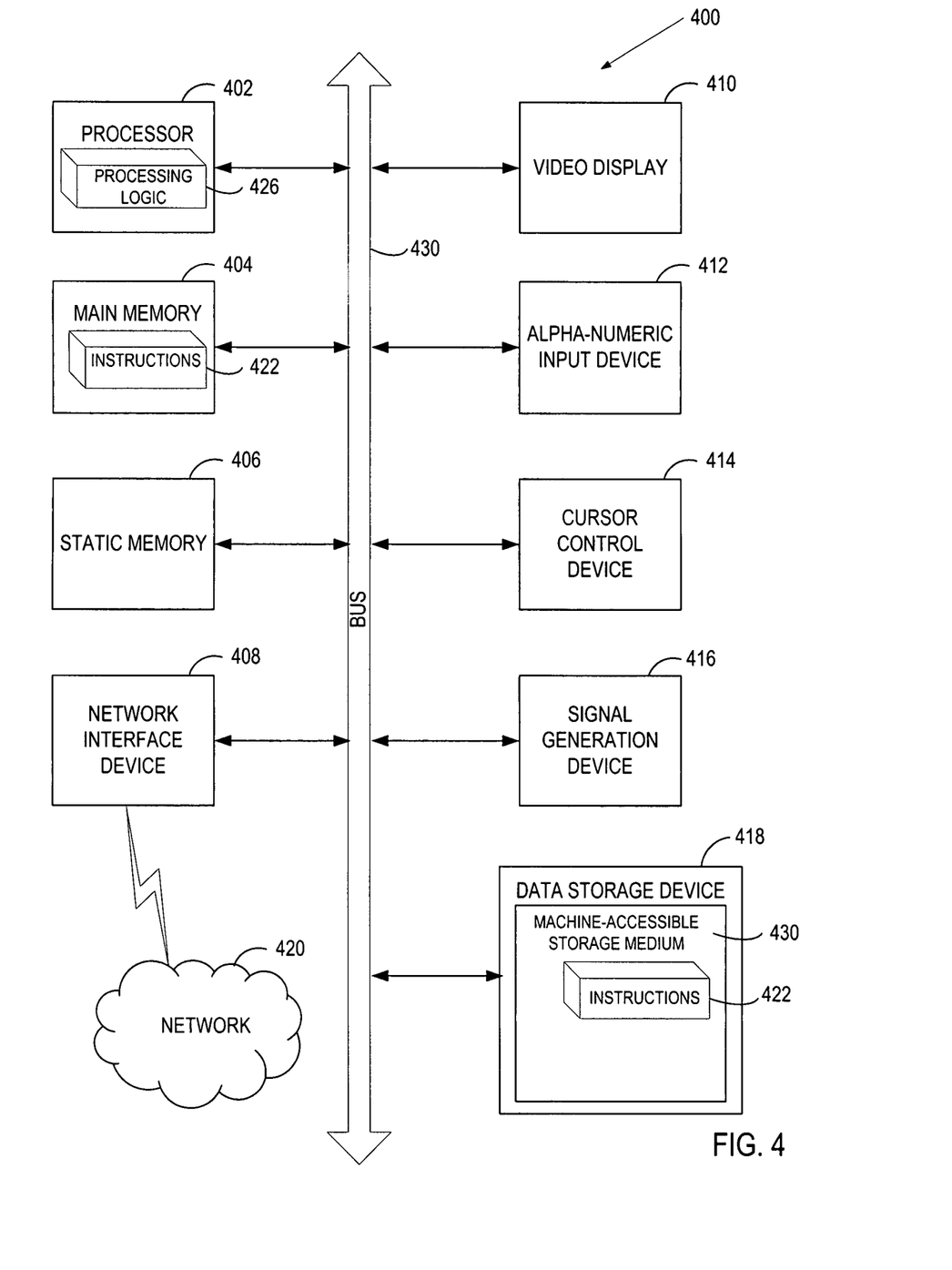
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of a method and an apparatus to validate a web session in a proxy server have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    receiving, by a proxy server computer communicably coupled between an application server and a client, a request to access predetermined content by the client, wherein the predetermined content is offloaded from the application server to the proxy server computer, and wherein the request includes a message previously issued by the application server to the client, the message comprising a unique message identifier, a message authentication code, a timestamp and an access control token that identifies a type of content that the client is allowed to access;
    controlling, by the proxy server computer, the access to the predetermined content by the client by validating the message authentication code, and checking the timestamp and the access control token included in the message;
    calculating, by the proxy server computer, a new message authentication code and a new timestamp using the access control token previously provided by the application server for the predetermined content; and
    issuing a new message to the client by the proxy server computer, the new message comprising a new unique message identifier, the new message authentication code, the new timestamp, and the access control token, the new message to replace the message issued by the application server to the client.

2. The method of claim 1, wherein validating the message authentication code comprises:
    computing a verification message authentication code based on the access control token; and comparing the verification message authentication code against the message authentication code within the request.

3. The method of claim 1, wherein controlling access to the predetermined content by the client comprises:
checking the access control token within the request from the client to determine if the client is authorized to access the predetermined content.

4. The method of claim 1, further comprising:
serving the predetermined content to the client if the message authentication code is validated and the access control token within the request indicates that the client has been authorized to access the predetermined content.

5. The method of claim 1, further comprising:
denying the client access to the predetermined content if the message authentication code is invalid.

6. The method of claim 1, further comprising:
denying the client access to the predetermined content if the access control token within the request from the client indicates that the client is not authorized to access the predetermined content.

7. The method of claim 1, wherein the predetermined content comprises static content.

8. A proxy server computer comprising:
a memory;
a processing device communicably coupled to the memory;
a first network interface, executable by the processing device from the memory on the proxy server computer, to communicatively couple the proxy server computer to a client in order to receive an access request from the client to access predetermined content, wherein the predetermined content is offloaded from an application server to the proxy server computer, and wherein the access request includes a message previously issued by the application server to the client, the message comprising a unique message identifier, a message authentication code, a timestamp and an access control token; and
an authentication module, executable by the processing device from the memory on the proxy server computer, to:
authenticate the client based on validating the message authentication code, and checking the timestamp and the access control token included in the message;
calculate a new message authentication code and a new timestamp using the access control token previously provided by the application server for the predetermined content; and
issue a new message to the client, the new message comprising a new unique message identifier, the new message authentication code, the new timestamp, and the access control token, the new message to replace the message issued by the application server to the client.

9. The apparatus of claim 8, further comprising:
a second network interface, executable on the proxy server computer, to communicatively couple to the application server.

10. The apparatus of claim 8, wherein the authentication module is further to compute a validation message authentication code based the access control token in the access request from the client and to compare the validation message authentication code computed against the message authentication code within the access request.

11. The apparatus of claim 8, wherein the authentication module is operable to check the access control token within the access request from the client to determine if the client is authorized to access the predetermined content.

12. The apparatus of claim 8, wherein the authentication module is operable to serve the predetermined content to the client if the message authentication code within the access request from the client is validated and the access control token within the access request indicates that the client has been authorized to access the predetermined content.

13. The apparatus of claim 8, wherein the authentication module is operable to deny the client access to the predetermined content if the message authentication code within the access request from the client is invalid.

14. The apparatus of claim 8, wherein the authentication module is operable to deny the client access to the predetermined content if the access control token within the access request from the client indicates that the client is not authorized to access the predetermined content.

15. A system comprising the proxy server computer of claim 8, further comprising the application server and a backend server coupled to the application server.

16. A system comprising the proxy server computer of claim 8, further comprising the application server and a backend server coupled to the application server, wherein the backend server comprises a database server.

17. A system comprising the proxy server computer of claim 8, wherein the predetermined content comprises static content, and the system further comprises:
a repository coupled to the proxy server computer, to store the static content.

18. A non-transitory machine-readable medium that includes instructions that, when executed by a processor, will cause the processor to perform operations comprising:
receiving an access request at a proxy server running on the processor, the access request being a request from a client to access predetermined content offloaded from an application server to the proxy server, wherein the request includes a message previously issued by the application server to the client, the message comprising a unique message identifier, a message authentication code, a timestamp and an access control token;
controlling, by the proxy server, access to the predetermined content by the client by validating the message authentication code, and checking the timestamp and the access control token included in the message;
calculating, by the proxy server, a new message authentication code and a new timestamp using the access control token previously provided by the application server to the proxy server for the predetermined content; and
issuing a new message to the client, the new message comprising a new unique message identifier, the new message authentication code, the new timestamp, and the access control token, the new message to replace the message issued by the application server to the client.

19. The machine-readable medium of claim 18, wherein using the proxy server to control access to the predetermined content by the client comprises:
using the proxy server to compute a validation message authentication code based the access control token in the access request from the client; and
using the proxy server to compare the validation message authentication code computed against the message authentication code within the access request.

20. The machine-readable medium of claim 18, wherein using the proxy server to control access to the predetermined content by the client comprises:

using the proxy server to check the access control token within the access request from the client to determine if the client is authorized to access the predetermined content.

21. The machine-readable medium of claim 18, wherein the operations further comprise:
serving the predetermined content to the client if the message authentication code within the access request from the client is validated and the access control token within the access request indicates that the client has been authorized to access the predetermined content.

22. The machine-readable medium of claim 18, wherein the operations further comprise:
denying the client access to the predetermined content if the message authentication code within the access request from the client is invalid.

23. The machine-readable medium of claim 18, wherein the operations further comprise:
denying the client access to the predetermined content if the access control token within the access request from the client indicates that the client is not authorized to access the predetermined content.

24. The machine-readable medium of claim 18, wherein the predetermined content comprises static content.

\* \* \* \* \*